United States Patent [19]

Takagi et al.

[11] Patent Number: 4,485,622
[45] Date of Patent: Dec. 4, 1984

[54] EXHAUST GAS CLEANING DEVICE FOR INTERNAL COMBUSTION ENGINE

[75] Inventors: Shigeru Takagi, Anjo; Yukihisa Takeuchi, Aichi; Shigeru Kamiya, Chiryu; Masahiro Tomita, Anjo; Kiyohiko Oishi, Susono; Kiyoshi Kobashi, Mishima, all of Japan

[73] Assignees: Nippon Soken, Inc., Nishio; Toyota Jidosha Kogyo Kabushiki Kaisha, Toyota, both of Japan

[21] Appl. No.: 309,409

[22] Filed: Oct. 7, 1981

[30] Foreign Application Priority Data

Oct. 9, 1980 [JP] Japan ................... 55-141794

[51] Int. Cl.³ .............................................. F01N 3/02
[52] U.S. Cl. ........................................ 60/296; 60/297; 60/303; 60/311; 55/282; 55/287; 55/466; 55/DIG. 10; 55/DIG. 30
[58] Field of Search ................ 60/296, 297, 303, 311, 60/300; 55/DIG. 10, DIG. 30, 282, 287, 466

[56] References Cited

U.S. PATENT DOCUMENTS

| | | | |
|---|---|---|---|
| 1,789,812 | 1/1931 | Frazer | 60/300 |
| 2,898,202 | 8/1959 | Houdry | 60/300 |
| 3,350,878 | 11/1967 | Lambert | 60/303 |
| 3,470,689 | 10/1969 | Gurr | 60/303 |
| 3,503,716 | 3/1970 | Berger | 60/297 |
| 4,167,852 | 9/1979 | Ludecke | 60/311 |
| 4,281,512 | 8/1981 | Mills | 55/DIG. 30 |
| 4,319,896 | 3/1982 | Sweeney | 60/311 |
| 4,329,162 | 5/1982 | Pitcher | 60/311 |
| 4,345,431 | 8/1982 | Suzuki | 60/297 |

Primary Examiner—Douglas Hart
Attorney, Agent, or Firm—Cushman, Darby & Cushman

[57] ABSTRACT

An exhaust gas cleaning device comprises at least one exhaust gas flowing passage, at least one particulates collecting member composed of two filter elements having different heat capacity, which is disposed within the exhaust gas flowing passage and heating means which is interposed between the filter elements so as to be closely contacted therewith. The filter element having smaller heat capacity is disposed on the upper stream side of the heating means and the filter element having larger heat capacity is disposed on the downstream side thereof. The filter element having smaller heat capacity is rapidly heated by the heating means and the heat of the filter element having smaller heat capacity is transmitted to the filter element having larger heat capacity. All of the particulates collected by the particulates collecting member can be burnt off with excellent heat efficiency.

9 Claims, 7 Drawing Figures

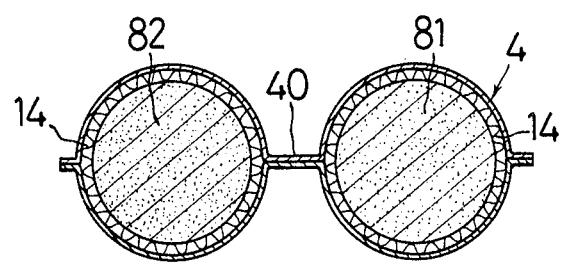
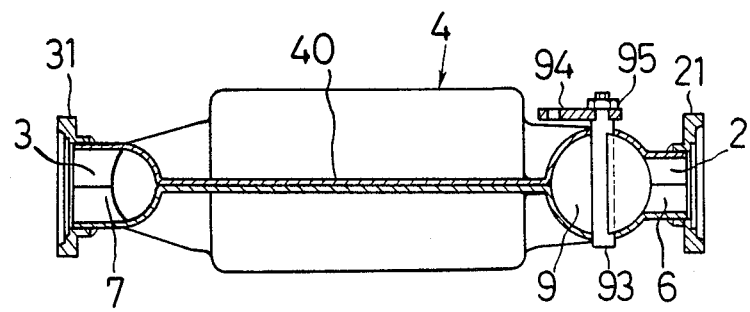

EXHAUST GAS CLEANING DEVICE FOR INTERNAL COMBUSTION ENGINE

BACKGROUND OF THE INVENTION

The present invention relates to an exhaust gas cleaning device for eliminating particulates such as carbon particles in exhaust gases of an internal combustion engine, particularly to an exhaust gas cleaning device provided with at least one particulates collecting member and heating means for burning the particulates collected by the particulates collecting member.

One of the conventional exhaust gas cleaning devices for an internal combustion engine, comprises a filter member operating as the particulates collecting member for collecting particulates mainly composed of carbon particles, which is disposed in an exhaust gas flowing passage. In this conventional device, the particulates collected by the filter member are heated by the exhaust gases flowing from the internal combustion engine to be burnt off.

However, this conventional device has the problem that the filter member is clogged with the collected particulates.

Namely, the temperature of the exhaust gases does not rise above the combustion temperature of carbon (about 600° C.) under the usual driving condition of a vehicle running on a street.

Therefore, the collected particulates do not burn to clog the filter member.

In order to prevent the filter member from being clogged with the collected particulates, it has been proposed that the device further comprises heating means which is positioned on the upstream side of the filter member adjacent thereto for burning the collected particulates when the amount thereof increases, However, such a device as described above has the problem that a sufficiently large amount of heat required to burn the collected particulates completely, cannot be obtained.

Namely, the upstream side of the filter member can be heated to the combustion temperature of the collected particulates by a relatively small amount of heat. But in order to heat the whole of the filter member to the above described temperature, a considerable large amount of heat is required.

In addition, since a large amount of exhaust gases, of which the temperature is lower than that of the heating means, flow through the filter member while the filter member is heated by the heating means, heating efficiency is lowered.

Accordingly, one object of the present invention is to provide an exhaust gas cleaning device wherein heating efficiency of the particulates collecting member is improved.

Another object of the present invention is to provide an exhaust gas cleaning device wherein at first one portion of the particulates collecting member is rapidly heated by means of the heating means and then the other portion thereof receives heat from the heated portion thereof.

Still another object of the present invention is to provide an exhaust gas cleaning device provided with such means to stop the flow of exhaust gases or reduce the amount of the exhaust gases flowing through the particulates collecting member while the particulates collecting member is heated by means of the heating means.

A further object of the present invention is to provide an exhaust gas cleaning device comprising heating means which is operable under driving conditions wherein the amount of flowing exhaust gases is small.

DESCRIPTION OF THE DRAWINGS

Other objects and advantages of the invention will become apparent from the following description of embodiments with reference to the accompanying drawings wherein:

FIG. 3 is a cross sectional view taken along the line III—III of FIG. 2;

FIG. 4 is a cross sectional view taken along the line IV—IV of FIG. 2;

SUMMARY OF THE INVENTION

The exhaust gas cleaning device of the present invention comprises at least one exhaust gas flowing passage, at least one particulates collecting member composed of two filter elements having different heat capacities, which is disposed within the exhaust gas flowing passage and heating means which is interposed between the filter elements so as to be closely contacted therewith.

The filter element having smaller heat capacity is disposed on the upstream side of the heating means and the filter element having larger heat capacity is disposed on the downstream side thereof.

Since the heating means is disposed within the particulates collecting member, heat of the heating element is easily transmitted into the whole of the particulates collecting member.

And by operating the heating means under a driving condition wherein the amount of the exhaust gases is relatively small or in such a state that the amount of the exhaust gases is controlled small, the whole of the particulates collecting member can be sufficiently heated with greater efficiency.

DETAILED DESCRIPTION OF THE INVENTION

Hereinafter, the present invention will be explained in accordance with the several embodiments with reference to the accompanied drawings.

Figure 1:
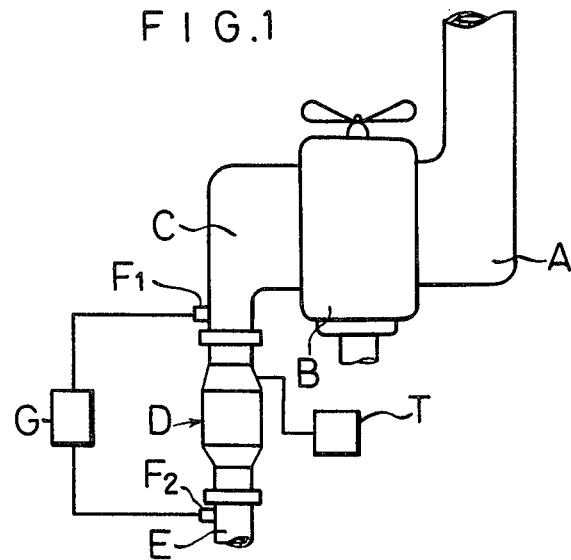
FIG. 1 is a view showing one example of the position where the exhaust gas cleaning device of the present invention is mounted.

As shown in FIG. 1, an exhaust gas cleaning device D of the present invention is interposed between an exhaust manifold C and an exhaust pipe E or disposed in the exhaust pipe E. The exhaust gas cleaning device D collects and cleans particulates contained within the exhaust gases which are discharged from a diesel engine B. Reference character A designates an intake manifold and reference character T designates a timer which is provided in a control circuit (not shown) and is electrically connected to a heating means as described later.

Pressure taps $F_1$ and $F_2$ are provided on the upstream side of the exhaust gas cleaning device D and the downside thereof respectively.

These pressure taps $F_1$ and $F_2$ are connected to a differential pressure detector G which indirectly detects the volume of particles collected by the particulates collecting member of the exhaust gas cleaning device D by detecting the differential pressure between the upstream side and the downstream side of the particulates collecting member, which increases as the volume of the particulates collected by the particulates collecting member increases.

Figure 2:
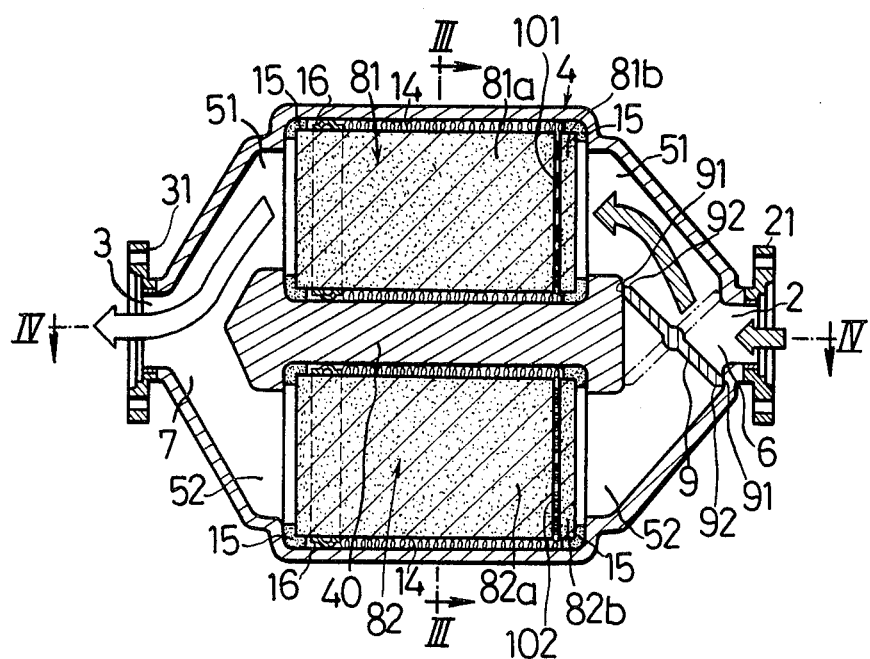
FIG. 2 is a longitudinal sectional view of the exhaust gas cleaning device of a first embodiment of the present invention.

FIGS. 2, 3 and 4 show a first embodiment of the present invention.

A housing 4 is provided with an exhaust gas inlet port 2, an exhaust gas outlet port 3 and two exhaust gas flowing passages 51 and 52 communicated with the exhaust gas inlet port 2 and the exhaust gas outlet port 3 respectively. Two exhaust gas flowing passages 51 and 52 are separated from each other by a partition wall 40.

On the upstream side of the exhaust gas flowing passages 51 and 52, an exhaust gas inlet chamber 6 is formed and on the downstream side thereof, an exhaust gas outlet chamber 7 is formed.

Within the exhaust gas flowing passages 51 and 52, a first particulates collecting member 81 and a second particulates collecting member 82 carrying oxidizing catalyst, are disposed respectively.

The particulates collecting members 81 and 82 are composed of filter elements 81a and 82a having larger heat capacity respectively and filter elements 81b and 82b having smaller heat capacity respectively.

The filter elements 81b and 82b are disposed on the upstream side of the exhaust gas flowing passages 51 and 52.

And between the filter elements 81a and 81b and between 82a and 82b, heating means 101 and 102 are interposed respectively.

Within the exhaust gas inlet chamber 6, an exhaust gas diverter valve 9 is provided for directing the exhaust gases from the inlet port 2 into either one of the first collecting member 81 and the second collecting member 82 while blocking the flow of exhaust gases into the other collecting member.

The exhaust gas cleaning device having the above described structure is connected to exhaust pipes (not shown) by flanges 21 and 31 which are provided at the inlet port 2 and the exhaust port 3 respectively.

The housing 4 is formed by welding an upper housing and a lower housing which are made of heat resistant plate such as stainless steel plate. Between the upper housing and the lower housing, a first exhaust gas flowing passage 51 and a second exhaust gas flowing passage 52 each of which has a circular cross section are formed. Within the first exhaust gas flowing passage 51 and the second exhaust gas flowing passage 52, particulates collecting members 81 and 82 are disposed respectively.

The particulates collecting members 81 and 82 are formed of heat resistant material having such narrow open passages as to permit exhaust gases to flow therethrough and to collect particulates within exhaust gases. For example, foamed ceramic or stainless steel wool is used.

The surface of each of the particulates collecting members 81 and 82 is coated with $\gamma$ alumina or the like and oxidizing catalyst containing platinum as a main ingredient is made to be carried thereon.

The filter elements 81b and 82b which are positioned on the upstream side of the heating means 101 and 102 are formed much thinner than the filter elements 81a and 82a which are positioned on the downstream side thereof. Therefore, heat capacity of the filter elements 81b and 82b is smaller than that of the filter elements 81a and 82a.

As the heating means 101 and 102, electric heaters provided with nichrome wire are used, for example.

The nichrome wire is covered by a protecting pipe made of stainless steel through electric insulating pulverulent body of magnesia.

The electric heaters 101 and 102 are assembled between the filter elements 81a and 81b and between 82a and 82b while being compressed thereby in the axial direction thereof respectively.

Both ends of each of the electric heaters 101 and 102 are connected to a control circuit (not shown) through terminals (not shown) which are fixed to the housing 4.

In the space formed between the outer peripheral surface of each of the particulates collecting members 81 and 82 and the inner peripheral surface of the housing 4, a shock absorbing member 14 made of metallic wire is inserted for preventing each of the particulates collecting members 81 and 82 from being damaged due to shock applied thereto.

The shock absorbing member 14 supports each of the particulates collecting members 81 and 82 in the peripheral direction thereof.

In the space surrounding both ends of each of the particulates collecting members 81 and 82, annular bodies made of metallic fine wire fabric 15 are inserted under pressure to support each of the particulates collecting members 81 and 82 in the axial direction thereof and to absorb shock and vibration applied thereto.

And an annular sealing member 16 is inserted in the space on the downstream side of each of the particulates collecting members 81 and 82 under pressure for preventing the uncleaned exhaust gases from being discharged from the space.

The annular sealing member 16 has a wave-shaped, V-shaped or trapezoid-shaped cross section and is formed by compressing metallic wire such as Inconel or stainless steel fine wire fabric of which diameter is about 0.1 to 0.15 mm into bulk density of about 4 g/cm$^3$.

Since the sealing member 16 having the above described structure has large resilience, the sealing member 16 is closely contacted with the outer periphery of each of the particulates collecting members 81 and 82 to exhibit excellent sealing effect.

The exhaust gas diverter valve 9 is composed of a butterfly valve which is supported by the exhaust gas inlet chamber 6 so as to turn on a valve shaft thereof.

Upon turning, an inclined portion 91 and 92 formed in the periphery of the butterfly valve fits into a valve seat surface formed within the housing 4.

As a result, exhaust gases are permitted to flow into either one of the particulates collecting members 81 and 82 and are blocked to flow into the other particulates collecting member.

The butterfly valve 9 is turned by hand or by means of a control device (not shown).

Hereinafter, the operation of the exhaust gas cleaning device of the first embodiment will be explained.

When the exhaust gas diverter valve 9 turns to such a position as to communicate the exhaust gas inlet chamber 6 with the exhaust gas flowing passage 51 while blocking the flow of exhaust gases into the exhaust gas flowing passage 52 as shown in FIG. 2, exhaust gases containing particulates flow from the exhaust gas inlet port 2 into the first collecting member 81 as shown by the hatched arrow and cleaned exhaust gases are discharged from the exhaust gas outlet port 3 after the particulates are eliminated by the first collecting member 81, as shown by the white arrow.

While the exhaust gases flow within the first exhaust gas flowing passage 51, the electric heater 102 disposed within the second particulates collecting member 82 starts to generate heat, upon receiving electric current. And the filter elements 82a and 82b are heated thereby.

The filter element 82b which is disposed on the upstream side of the electric heater 102 is heated to about 700°~800° C. in very short time by a small amount of heating energy due to small heat capacity.

As a result, the carbon particulates previously collected by the filter element 82b are burnt off.

Figure 6:
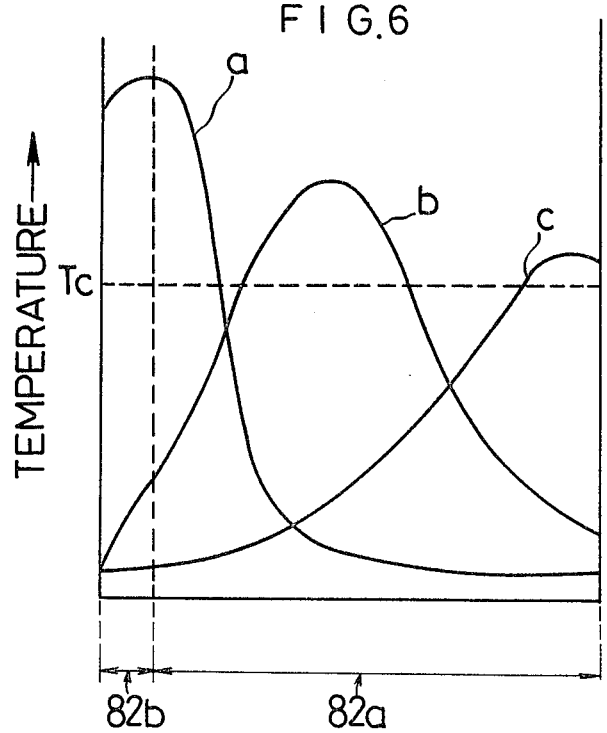
FIG. 6 is a view showing the temperature distribution within the particulates collecting member.

The distribution of the temperature within the particulates collecting member 82 is shown by the line a of FIG. 6 when the particulates collected by the filter element 82b are burnt off.

Namely, the temperature of the upstream side of the particulates collecting member 82 (left side in FIG. 6) is very high (about 700° to 800° C.) and the downstream side thereof (right side in FIG. 6) is scarcely heated by the electric heater 102.

In FIG. 6, abscissa denotes the arrangement of the particulates collecting member 82 composed of the filter elements 82a and 82b.

Tc denotes the combustion temperature of carbon particulates. When the particulates collecting members 81 and 82 do not carry oxidizing catalyst, Tc is about 600° C.

When they carry oxidizing catalyst respectively, Tc is decreased to about 500° to 550° C., so that the amount of heating energy required to burn off the particulates collected by the collecting members 81 and 82 can be largely decreased.

When a predetermined time required to heat the filter element 82b passes, electric current is no longer supplied to the electric heater 102 by means of a timer T of a control circuit (not shown). At this time, the exhaust gas diverter valve 9 slightly opens to flow a small amount of exhaust gases (about 40 l. per minute) into the particulates collecting member 82.

After the electric current is no longer supplied to the electric heater 102, a small amount of exhaust gases are continuously supplied into the particulates collecting member 82. The heat stored in the filter element 82b having smaller heat capacity is transmitted into the small amount of exhaust gases supplied through the slightly opening valve 9.

Then, the small amount of exhaust gases which are heated by the filter element 82b flow into the filter element 82a having larger heat capacity to transmit heat into the filter element 82a.

As a result, the distribution of temperature within the particulates collecting member 82 is changed from the line b into the line c of FIG. 6.

The time required to increase the temperature on the downstream side of the particulates collecting member 82 and 81 to above Tc is decided by the material and size of the filter elements 82a and 82b or 81a and 81b, the amount of exhaust gases, the amount of heating energy supplied by the heating means and the like.

After such time as described above passes, the timer of the control circuit (not shown) starts operating to close the exhaust gas diverter valve 9 again.

As a result, the second exhaust gas flowing passage 52 is closed again by the diverter valve 9.

Next, when the amount of the particulates collected by the first particulates collecting member 81, reaches such a predetermined level as to restrict the flow of the exhaust gases therethrough, the differential pressure detector G (FIG. 1) generates detecting signals.

The detecting signals from the differential pressure detector G are supplied into a control circuit (not shown) and a manual or automatic control device (not shown) operates to change the position of the exhaust gas diverter valve 9 into that shown by the dot-dash line of FIG. 2.

As a result, into the second particulates collecting member 82 which has been cleaned by burning off the particulates collected thereby, exhaust gases are supplied. After the particulates contained within the exhaust gases are collected by the second particulates collecting member 82, cleaned exhaust gases are discharged from the exhaust gas outlet port 3.

And the detecting signals generated by the differential pressure detector G, are supplied into the control device and the timer T starts operating to supply electric current to the heating means 101.

As a result, the filter elements 81a and 81b are heated. Then, the particulates previously collected by the first particulates collecting member 81 are burnt off in the same process as that in the case of the collecting member 82.

According to the first embodiment of the present invention, the particulates collected by the particulates collecting members can be burnt off with excellent heating efficiency.

Namely, in the device of the first embodiment, while one of two particulates collecting members is heated, the exhaust gases flow into the other particulates collecting member. Therefore, the inactive particulates collecting member is heated to a predetermined temperature in a short time by a small amount of heating energy without being influenced by exhaust gases of which the temperature is lower than the combustion temperature of carbon.

Furthermore, in the device of the first embodiment, the filter element having smaller heat capacity, which is positioned on the upstream side of the inactive particulates collecting member is rapidly heated to a predetermined temperature. Then, a small amount of exhaust gases is supplied into the inactive particulates collecting member to transmit the heat from the upstream side thereof into the downstream side thereof.

Therefore, heat energy required to heat the inactive particulates collecting member can be made smaller.

And by making the collecting members to carry oxidizing catalyst, carbon can be burnt off at a temperature under the ordinary combustion temperature of carbon. Therefore, the heat energy required to heat the inactive particulates collecting member can be made much smaller.

In the device of the first embodiment, particulates collected by the particulates collecting members are alternately burnt off so that the collecting members are prevented from being clogged with the particulates.

And since in the space formed in the outer periphery of each of the particulates collecting members, an annular sealing member 16 is disposed, the exhaust gas can be prevented from leaking through the space.

Figure 5:
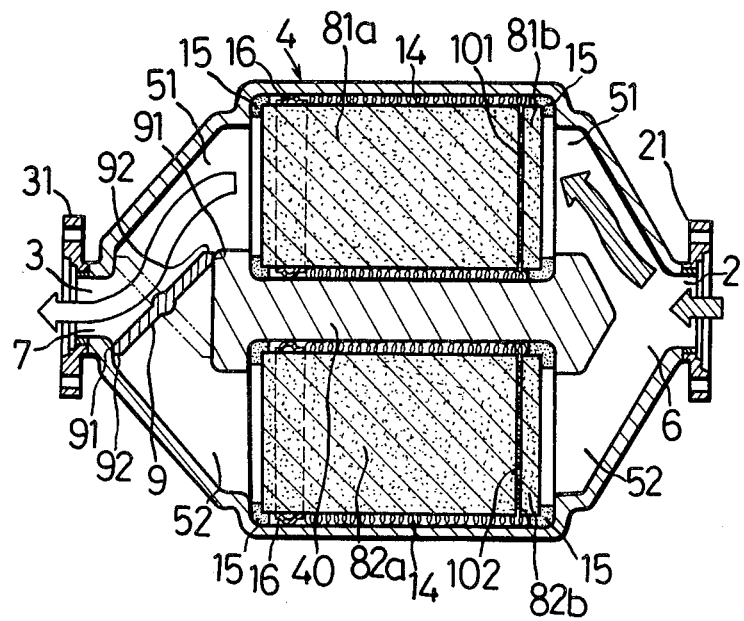
FIG. 5 is a longitudinal sectional view of the exhaust gas cleaning device of a second embodiment.

FIG. 5 shows a second embodiment of the present invention.

In the second embodiment, the exhaust gas diverter valve 9 is disposed within the exhaust gas outlet chamber 7.

Other structure of the device of the second embodiment is substantially the same as that of the first embodiment.

When the exhaust gas diverter valve 9 turns to the position as shown by the continuous line in FIG. 5, the exhaust gases flow only into the particulates collecting member 81 disposed within the exhaust gas flowing passage 51. The particulates contained within the exhaust gases are collected by the particulates collecting member 81.

At this time, the particulates previously collected by the collecting member 82 disposed in the exhaust gas flowing passage 52 are heated by the heating means 102 to be burnt off.

Next, when the exhaust gas diverter valve 9 turns to the position shown by the dot dast line, the exhaust gases flow only into the particulates collecting member 82.

Since the exhaust gas flowing passage 51 is closed on the downstream side thereof by the exhaust gas diverter valve 9, the exhaust gases do not flow therethrough.

And the particulates previously collected by the particulates collecting member 81 are heated by the heating means 101 to be burnt off.

The operation of each member of the device of the second embodiment is substantially the same as that of the first embodiment.

And the device of the second embodiment exhibits similar effect to that of the first embodiment.

Figure 7:
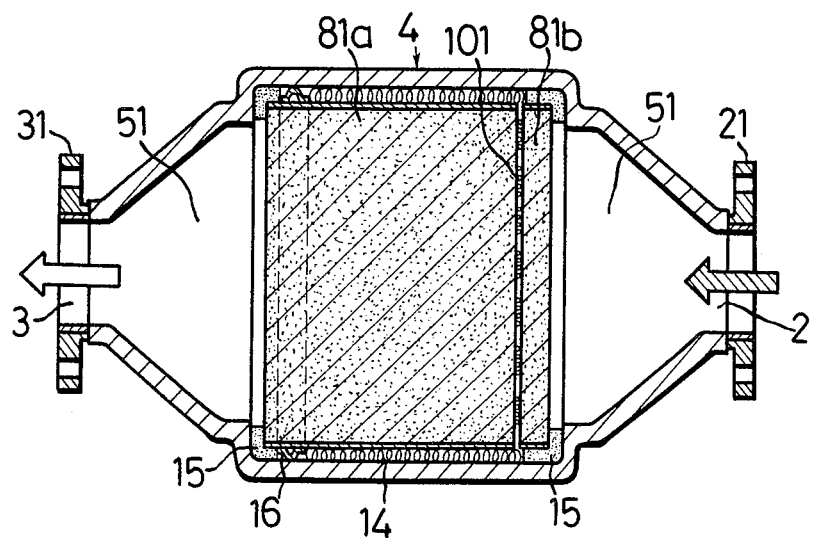
FIG. 7 is a longitudinal sectional view of the exhaust gas cleaning device of a third embodiment.

FIG. 7 shows a third embodiment of the present invention.

The exhaust gas cleaning device of the third embodiment is provided with a single exhaust gas flowing passage 51 wherein the filter element 81b of which heat capacity is small and the filter element 81a of which heat capacity is large are disposed in series with each other in the axial direction thereof, and the electric heater 101 is interposed between the filter elements 81b and 81a so as to be closely contacted therewith.

The exhaust gas cleaning device of the third embodiment is not provided with an exhaust gas diverter means as shown in FIGS. 2 and 5.

In addition, the device of the third embodiment comprises the differential pressure detector D shown in FIG. 1, a warning lamp (not shown) which is provided within a compartment of a vehicle for informing a driver that the amount of the particulates collected by the particulates collecting member has reached a predetermined level, a switching member (not shown) which is provided within the compartment and is manually operated to supply electric current into the electric heater, and a timer T which operates to automatically stop supplying electric current into the electric heater when a predetermined time passes after the electric heater begins to operate.

Hereinafter, the operation of the device of the third embodiment will be explained.

Exhaust gases flow through the filter elements 81b and 81a disposed in the exhaust gas flowing passage 51. And the particulates contained within the exhaust gases are collected by the filter elements 81b and 81a.

When the amount of the collected particulates increases and reaches such a predetermined level as to restrict the flow of the exhaust gases, the differential pressure detector D detects such level and generates a detecting signal to light the warning lamp.

Knowing that the amount of the particulates collected by the filter elements 81a has reached a predetermined level by the lighted warning lamp, the driver stops his vehicle at a neighboring parking place and operates the switching member to supplying electric current the electric heater 101 while continuing an idling condition of the internal combustion engine of his vehicle.

At this time, a combustion indicating lamp (not shown) lights up and the warning lamp goes out.

Upon receiving electric current through the switching member, the electric heater 101 starts to generate heat. The filter elements 81a and 81b are heated by the electric heater 101. The temperature of the filter element 81b of which heat capacity is small, rises to 700° to 800° C. in a short time and then the particulates collected by the filter element 81b begin to burn.

And after such time as is required for sufficiently heating the filter element 81b, the timer T which is provided in the control circuit for controlling the electric heater 101 and other lamps, operates to stop supplying electric current to the electric heater.

Since a small amount of exhaust gases is supplied into the filter elements 81a and 81b from the internal combustion engine under an idling condition, the heat of the filter element 81b is transmitted to the filter element 81a which is positioned on the downstream side of the filter element 81b.

As a result, the whole of the filter element 81a reaches a temperature over the combustion temperature of the collected particulates so that the combustion of the collected particulates is spread from the filter element 81b to the downstream portion of the filter element 81a and the particulates collected by the filter elements 81a and 81b are completely burnt off.

Then, after such time as is required for increasing the temperature of the filter element 81a above the combustion temperature of the collected particulates, the timer T operates to switch off the combustion indicating lamp. As a result, the driver is informed of the completion of the combustion of the collected particulates.

As described above, in the exhaust gas cleaning device of the present invention, the particulates collecting member which is disposed within the exhaust gas flowing passage is composed of a filter element of which heat capacity is small and a filter element of which heat capacity is large, the filter element of which heat capacity is small is positioned on the upstream side of the exhaust gas flowing passage, and heating means is disposed between two filter elements so as to be closely contacted therewith.

Therefore, when the heating means generates heat, the filter element of which heat capacity is small is heated to a temperature over the combustion temperature of the collected particulates in short time. Then, the heating means stops heating the filter elements. But, since two filter elements are arranged close to each other, the heat of the filter element of which heat capacity is small is transmitted to the filter element of which heat capacity is large so that the temperature of the filter element of which heat capacity is large, also rises to a temperature over the combustion temperature of the collected particulates.

Therefore, according to the present invention, the heat energy required to burn off all of the particulates collected by the particulates collecting member completely, can be reduced largely.

Furthermore, by stopping the flow of the exhaust gases or reducing the amount of flowing exhaust gases while the filter elements are heated by the heating means, heat energy of the heating means can be effectively used for heating the filter elements.

And by supplying a small amount of exhaust gases into the filter elements while the heat of the filter element of which heat capacity is small is transmitted to the filter element of which heat capacity is large, the transmission of heat is promoted.

In addition, according to the present invention, the filter elements having different heat capacities are separated. Therefore, the filter elements are prevented from being damaged due to the difference in temperature therebetween caused by the difference in heat capacities thereof.

The particulates collecting member may be composed of two filter elements made of two kinds of materials of which specific heat are different from each other. In this case, the filter element of which specific heat is small is arranged on the upstream side of the exhaust gas flowing passage.

And the particulates collecting member may be composed of two filter elements made of stainless steel wool bodies having different density from each other. In this case, the filter element having small density is arranged on the upstream side of the exhaust gas flowing passage.

Furthermore, the exhaust gas diverter means for alternately directing the flow of exhaust gases into either one of two exhaust gas flowing passages is not limited to a butterfly valve. Such other valve means as to operate the above described function can be used in place of the butterfly valve.

Having now fully described the invention, it will be apparent to one of ordinary skill in the art that many changes and modifications can be made thereto without departing from the spirit or scope of the invention as set forth herein.

What is claimed is:

1. An exhaust gas cleaning device for collecting and burning particulates contained within exhaust gases discharged from an internal combustion engine, comprising:
    a housing provided with an exhaust gas inlet port, an exhaust gas outlet port and at least one exhaust gas flowing passage which is formed between said ports so as to be communicated therewith;
    at least one particulates collecting member for collecting particulates, said member being disposed in said exhaust gas flowing passage and being composed of two filter elements made of heat resistant material and having a large number of small open passages; said two filter elements having different heat capacities, said filter elements being disposed in series within said exhaust gas flowing passage with said filter element having smaller heat capacity being positioned upstream of said filter element having larger heat capacity; and
    heating means for heating said filter elements and said particulates collected thereby, which is interposed between said filter elements so as to be closely contacted therewith;
    said filter elements being formed of ceramic foamed bodies of different volumes;

2. An exhaust gas cleaning device for collecting and burning particulates contained within exhaust gases discharged from an internal combustion engine, comprising:
    a housing provided with an exhaust gas inlet port, an exhaust gas outlet port and at least one exhaust gas flowing passage which is formed between said ports so as to be communicated therewith;
    at least one particulates collecting member for collecting particulates, said member being disposed in said exhaust gas flowing passage and being composed of two filter elements made of heat resistant material and having a large number of small open passages; said two filter elements having different heat capacities, said filter elements being disposed in series within said exhaust gas flowing passage with said filter element having smaller heat capacity being positioned upstream of said filter element having larger heat capacity; and
    heating means for heating said filter elements and said particulates collected thereby, which is interposed between said filter elements so as to be closely contacted therewith;
    said filter elements being formed of stainless steel wool bodies having different densities.

3. An exhaust gas cleaning device for collecting and burning particulates contained within exhaust gases discharged from an internal combustion engine, comprising:
    a housing provided with an exhaust gas inlet port, an exhaust gas outlet port and at least one exhaust gas flowing passage which is formed between said ports so as to be communicated therewith;
    at least one particulates collecting member for collecting particulates, said member being disposed in said exhaust gas flowing passage and being composed of two filter elements made of heat resistant material and having a large number of small open passages; said two filter elements having different heat capacities, said filter elements being disposed in series within said exhaust gas flowing passage with said filter element having smaller heat capacity being positioned upstream of said filter element having larger heat capacity; and
    heating means for heating said filter elements and said particulates collected thereby, which is interposed between said filter elements so as to be closely contacted therewith;
    said filter elements being formed of bodies made of two kinds of material having different specific heats.

4. An exhaust gas cleaning device according to claims 1, 2 or 3, wherein:
    said heating means is composed of an electric heater provided with a resistance wire.

5. An exhaust gas cleaning device according to claims 1, 2 or 3, further comprising:
    means for detecting when the amount of the particulates collected by said particulates collecting member reaches a predetermined level and for operating an indicating signal; and
    means for operating said heating means for a predetermined period of time from the time when said indicating signal is operated.

6. An exhaust gas cleaning device according to claim 5, wherein:
    said heating means is composed of an electric heater.

7. An exhaust gas cleaning device according to claims 1, 2 or 3, wherein:
   said housing is provided with two exhaust gas flowing passages each having therein a particulates collecting member and a heating means; and
further comprising:
   exhaust gas diverter means within said housing for alternately directing the exhaust gases from said exhaust gas inlet port into either one of said two exhaust gas flowing passages;
   means for detecting when the amount of the particulates collected by each of said two particulates collecting members reaches a predetermined level and for generating a detecting signal; and
   means operable by said signal for operating said exhaust gas diverter means to direct the exhaust gases into one of said particulates collecting members when the amount of the particulates collected by the other particulates collecting member reaches a predetermined level.

8. An exhaust gas cleaning device according to claim 7, wherein;
   said heating means is composed of an electric heater; and
   timing means for operating said heater from the time when the amount of the particulates collected by said collecting member reaches said predetermined level until the temperature of the filter element having the smaller heat capacity rises above the combustion temperature of the particulates.

9. An exhaust gas cleaning device according to claim 8, including:
   control means for operating said diverter means so as to flow a small amount of exhaust gases into one of said particulates collecting members when said electric heater therein stops operation.

* * * * *